Aug. 22, 1961 L. LEE II 2,997,034
COMPENSATED CARBURETOR
Filed March 29, 1957
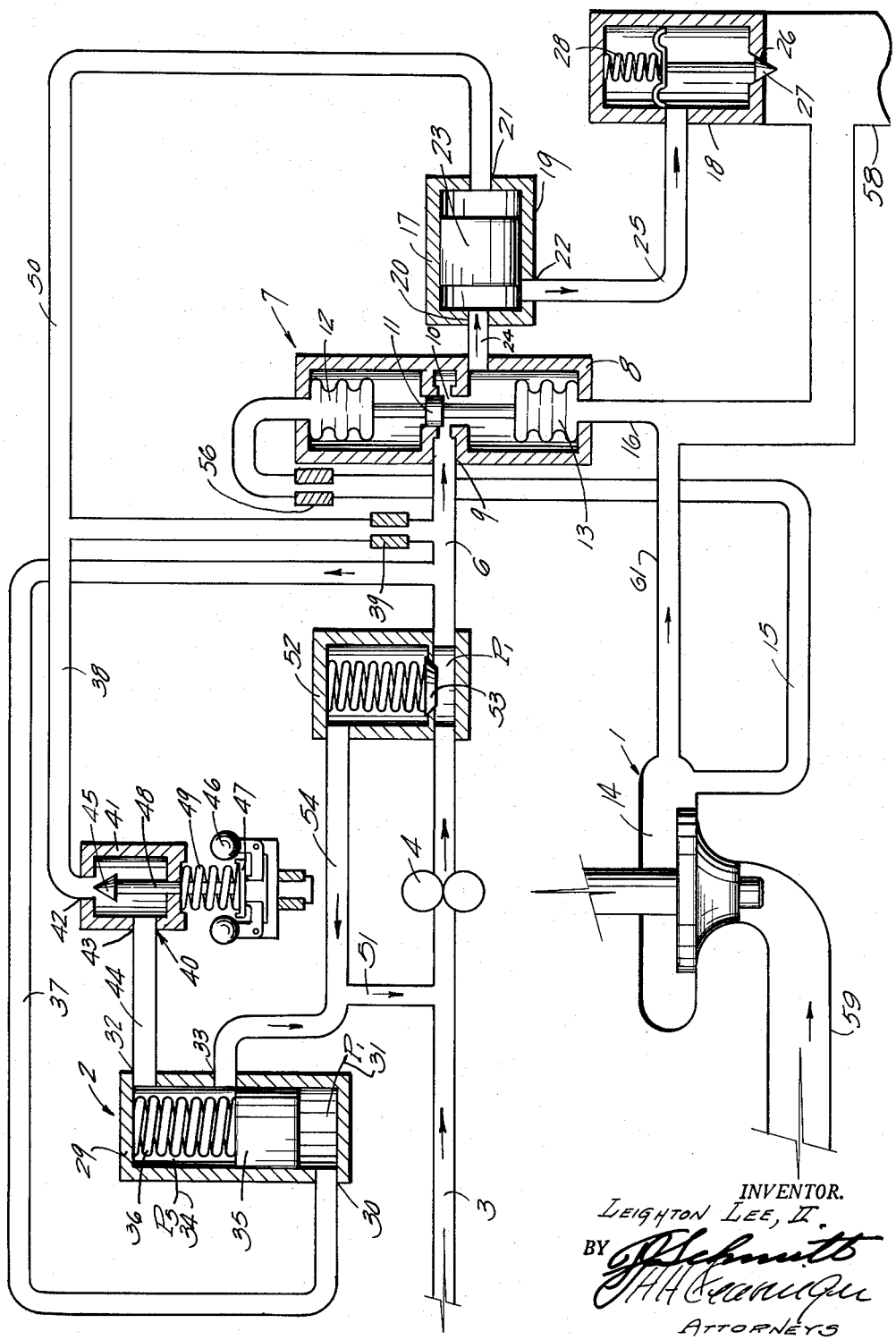
INVENTOR.
LEIGHTON LEE, II
BY
ATTORNEYS

2,997,034
COMPENSATED CARBURETOR

Leighton Lee II, Westbrook, Conn., assignor, by mesne assignments, to the United States of America as represented by the Secretary of the Navy
Filed Mar. 29, 1957, Ser. No. 649,570
1 Claim. (Cl. 123—119)

This invention relates to a compensator for a carburetor system for aircraft. A mechanism which will meter fuel to an aircraft reciprocating engine as a function of the pressure differential in the impeller discharge region and the impeller r.p.m. of a supercharger is called a "carburetor."

In the operation of aircraft engines, it is essential that a proper fuel to air ratio be maintained. A basic source of trouble in maintaining the proper fuel to air ratio lies in the fuel pressure system of the carburetor. If the fuel pressure in the carburetor varies, as that caused by a variation in fuel pressure delivered by the pump, it results in an unintentional variation in the fuel to air ratio. In carburetors of previous design, an attempt was made to maintain a constant pressure differential across the fuel pump by the use of a relief valve. However, under the varying conditions of pump r.p.m. and fuel demand by the engine, the relief valve has not been able to maintain the desired condition. Therefore, an additional means must be added to the carburetor to keep the fuel to air ratio at the desired point.

This invention proposes to maintain a constant pressure differential in the system so that a desired fuel to air ratio may be maintained by a compensator which is added to and forms a part of the carburetor system. The compensator consists of a small valve which is set to maintain a constant pressure differential across the speed senser unit and the supply line from the fuel pump. The differential is regulated by a control spring assembly acting directly on a moveable piston. Any change in pressure differential is immediately corrected by movement of the compensator and the desired pressure is maintained in the carburetor.

It is an object of this invention to maintain a desired pressure differential in the carburetor by a compensator so that a proper fuel to air ratio may be maintained.

Other objects and many of the attendant advantages of this invention will be readily appreciated as the same becomes better understood by reference to the following detailed description when considered in connection with the accompanying drawing.

In general, the carburetor theory is that the mass air flow through a supercharger, as used in reciprocating engines, is a function of the ratio $\Delta P/N$ where $\Delta P$ is the pressure difference between the supercharger's impeller discharge impact pressure ($P_t$) and the impeller static pressure ($P_s$), and N is the rotational speed of the supercharger impeller. An essential lineal relationship holds between the ratio $\Delta P/N$ and the mass air flow. A carburetor is a carburetion device which utilizes this relationship for metering fuel from a metering element. The fuel flow, as determined by the ratio $\Delta P/N$, in the invention, is applied to one side of a piston in a pressure regulator and further adjusted for engine speed and variations in pressure of the fuel supplied to the fuel pump etc., by means of a restricting orifice, speed senser and compensator. In the drawing, the supercharger is broadly indicated at 1, the metering element at 7, the compensator at 2 and speed senser and restriction at 40 and 38, respectively.

A fuel line 3 feeds a pump 4 to deliver fuel to the rest of the system at a desired pressure through an outlet line 6 connected to the pump. The line 6 leads to the metering element 7 which acts on the fuel flow rate by a pressure differential represented in the above formula by $\Delta P$. The metering element consists of a housing 8 having an opening 9 receiving the fuel line 6. The size of the passageway 10 in the metering element is controlled by a valve 11 the position of which is regulated by the pressure differential ($\Delta P$) existing between $P_t$ and $P_s$ as applied to bellows 12 and 13 through lines 15 and 16, respectively, from the impeller discharge area 14 of supercharger 1. A restrictor 56 is provided which will cause the air pressure in line 15 to drop to the value of the static pressure of the supercharger 1. The fuel is fed from the metering element 7 to a pressure regulator 17 and then out through a discharge nozzle 18 into a conduit 58, where it is mixed with air discharged from supercharger 1, and from which the mixture is conducted to the aircraft's engine (not shown) for combusting. The supercharger 1 receives air through conduit 59 and discharges it by conduit 61, which is connected to the fuel-air mixture carrying conduit 58.

The pressure regulator 17 consists of a housing 19 having openings 20 and 21 in its end walls and an opening 22 in the side wall. A piston 23 is mounted for sliding movement in the housing 19 and the position of the piston is regulated by the pressures entering the openings 20 and 21. A line 24 connects the pressure regulator to the metering element 7 and a line 25 connects the pressure regulator to the fuel discharge nozzle 18. The discharge opening 26 is regulated by valve 27 which is positioned by the pressure from the pressure regulator action on the spring controlled mechanism 28.

In order to maintain a desired fuel flow, as explained above, it is necessary to have a constant pressure differential between the pressure P1 from the fuel pump 4 and the pressure P5 in the by-pass line 44 from the speed senser 40. To achieve this, a compensator 2 is incorporated into the system. The compensator consists of a housing 29 having an opening 30 leading to a chamber 31 in the housing and openings 32 and 33 leading to a chamber 34 in the housing. A piston 35 is mounted for sliding movement in the housing and is urged by a spring 36 to keep the volume of chamber 31 at a minimum. A fuel line 37 connects chamber 31 to the fuel line 6 so that any change in pressure in the fuel line 6 results in a change in pressure in chamber 31.

A pressure bleed line 38 having a restriction 39 is connected to the fuel line 6 and the speed senser 40. The speed senser consists of a housing 41 having openings 42 and 43 for regulating the pressure delivered to the chamber 34 through line 44. The size of opening 42 is governed by a cone shaped plunger 45 which is positioned by the revolving flyweights 46 bearing on a flange 47 to move rod 48 and plunger 45 against the action of the spring 49. The speed at which the flyweights revolve is governed by the engine speed. A line 50 connects line 38 to opening 21 of the pressure regulator 17. A line 51 connects chamber 34 to the fuel line 3.

To allow for an additional pressure variation a relief valve 52 is mounted on the line 6 between the pump 4 and the line 37. A spring urged valve member 53 allows excessive pressure to leave the line 6. A line 54 connects the relief valve to the line 51.

In operation, the compensator 2 is adjusted so that a desired pressure differential exists between the pressure (P1) in the chamber 31 and the pressure (P5) in the chamber 34 by the control spring 36 acting on the piston 35. A change in pressure in the line 6 will be transmitted to the chamber 31 through the line 37 resulting in a variation of the pressure P1. The variation in P1—P5 from the set differential will cause the piston 35 to move and change the size of discharge opening 33 resulting in a change of pressure in line 51 and thereby correcting P1—P5 to the value which was originally selected. Thus, the compensator allows the use of a carburetor in conjunction with a standard fuel pump and relief valve.

Obviously many modifications and variations of the present invention are possible in the light of the above teachings. It is therefore to be understood that within the scope of the appended claims the invention may be practiced otherwise than as specifically described.

What is claimed is:

A carburetor unit comprising a fuel pump; a fuel metering element adapted to regulate fuel flow therethrough as a function of the pressure differential in the impeller discharge area of a supercharger and the impeller speed; a first fuel line connected to the low pressure side of said pump for supplying fuel to said pump; a second fuel line connecting the high pressure side of said pump with said metering element; a compensator comprising a hollow casing, a piston slideably disposed in and dividing said casing into a first chamber having an inlet and a second chamber having an inlet and an outlet, said piston being adapted for varying the size of said outlet by covering same; a first conduit connecting said first chamber inlet with said second fuel line; a second conduit having a restriction and speed governed restriction connecting said second chamber inlet with said second fuel line; a third conduit connecting said second chamber outlet with said first fuel line; spring means disposed in said second chamber of said compensator casing exerting a pressure on said piston to obtain a predetermined pressure differential between said compensator chambers; a pressure regulator having a fuel discharge outlet and a piston for varying the area of said outlet; a fourth conduit connecting said metering element to said pressure regulator at one side of said pressure regulator piston; and a fifth conduit connecting said second conduit and said pressure regulator at the other side of said pressure regulator piston; said pressure regulator outlet being disposed to discharge fuel received in said pressure regulator from said metering element.

References Cited in the file of this patent

UNITED STATES PATENTS

| 2,633,830 | McCourtney et al. | Apr. 7, 1953 |
| 2,689,606 | Mock | Sept. 21, 1954 |

FOREIGN PATENTS

| 745,146 | Great Britain | Feb. 22, 1956 |
| 762,194 | Great Britain | Nov. 28, 1956 |